United States Patent [19]

Dunsmore et al.

[11] Patent Number: 5,068,575

[45] Date of Patent: Nov. 26, 1991

[54] INDIRECT STORAGE CAPACITOR VOLTAGE SENSING MEANS FOR A FLYBACK TYPE DC-TO-DC CONVERTER

[75] Inventors: Clay A. Dunsmore, Batavia; Frederick T. Lucas, Rochester, both of N.Y.

[73] Assignee: Eastman Kodak Company, Rochester, N.Y.

[21] Appl. No.: 659,193

[22] Filed: Feb. 21, 1991

[51] Int. Cl.[5] .................... G03B 15/05; H05B 41/32; H02M 3/28

[52] U.S. Cl. .................... 315/241 P; 363/21; 354/127.12

[58] Field of Search .................... 363/21; 315/241 P; 354/127.12, 145.1

[56] References Cited

U.S. PATENT DOCUMENTS

| | | | |
|---|---|---|---|
| 3,564,393 | 2/1971 | Williamson | 363/21 |
| 3,863,128 | 1/1975 | Wilwerding | 320/21 |
| 4,068,150 | 1/1978 | Iwata et al. | 315/241 |
| 4,071,884 | 1/1978 | Maigret | 363/21 |
| 4,104,714 | 8/1978 | Smith et al. | 363/21 |
| 4,272,806 | 6/1981 | Metzger | 363/21 |
| 4,336,583 | 6/1982 | Campbell et al. | 363/21 |
| 4,425,611 | 1/1984 | Easter | 363/21 |
| 4,511,233 | 4/1985 | Kazami et al. | 354/418 |
| 4,540,265 | 9/1985 | Harvey | 354/417 |
| 4,630,916 | 12/1986 | Ishiguro et al. | 354/418 |
| 4,682,081 | 7/1987 | Sikora | 315/219 |
| 4,775,821 | 10/1988 | Sikora | 315/219 |

FOREIGN PATENT DOCUMENTS

| | | | |
|---|---|---|---|
| 84971 | 5/1985 | Japan | 363/21 |
| 2073918 | 10/1981 | United Kingdom | 363/21 |

OTHER PUBLICATIONS

Harris, "EHT Inverter for Geiger-Muller Tubes", Elect. Eug. vol. 51, No. 625, p. 18, Jul. 1979.

*Primary Examiner*—William H. Beha, Jr.
*Attorney, Agent, or Firm*—Michael J. Balconi-Lamica

[57] ABSTRACT

In a flyback type self-oscillating DC-to-DC converter, a voltage sensing means indirectly senses the storage capacitor voltage and indicates when the voltage across a storage capacitor has been charged to a predetermined charged value. The voltage sensing means comprises a voltage dividing resistor having a tap intermediate the ends thereof and being connected across a primary winding of a coupled inductor of the DC-to-DC converter. The voltage across the primary winding corresponds to a voltage on the storage capacitor according to the turns ratio of the primary winding to a secondary winding during a measurement period, the measurement period having first and second portions. A comparing means compares a voltage at the tap of the voltage dividing resistor with a predetermined reference voltage and provides an output signal having first and second conditions when the tap voltage is below or above, respectively, the predetermined reference voltage. The tap on the voltage dividing resistor is set to correspond to the predetermined reference voltage when the storage capacitor has been charged to the predetermined charged value. During the first portion of the measurement period, noise occurs in the primary winding voltage and is detected by the comparing means. To provide noise immunity, a latching means latches the comparing means output signal during the second portion of the measurement period. When latched in the first or second condition, the latched output signal is indicative of the storage capacitor voltage being below or above, respectively, the predetermined charged value.

16 Claims, 5 Drawing Sheets

INDIRECT STORAGE CAPACITOR VOLTAGE SENSING MEANS FOR A FLYBACK TYPE DC-TO-DC CONVERTER

BACKGROUND OF THE INVENTION

1. Field of the Invention

The present invention relates generally to voltage indication of an energy-storage capacitor used in low-voltage powered DC-to-DC converter devices. More particularly, the invention relates to a voltage sensing means for indirectly sensing storage capacitor voltage in DC-to-DC converters used in electronic flash devices.

2. Description of the Related Art

Many commercially available electronic flash devices monitor the voltage on a high voltage flash capacitor and inform a camera operator, via a ready lamp or by enabling a shutter release mechanism in an associated camera, when there is sufficient firing voltage for flash exposure. In some electronic flash devices, the flash capacitor voltage is monitored such that when the capacitor voltage reaches a predetermined level, the flash charging circuit is turned off. Traditionally, the full charge voltage on a flash capacitor is high (typically, 200 volts or more). In some electronic flash devices, a high voltage zener diode sensing circuit is employed to sense full charge voltage. Such a high voltage zener diode sensing circuit suffers in that it is expensive and also presents a inherent drainage problem to the flash capacitor. Other flash capacitor voltage sensing means have included resistive divided networks with luminescent devices connected across the flash capacitor. Most notably, this type of voltage sensing means suffers from leakage and drainage problems presented to the flash capacitor.

In U.S. Pat. No. 4,630,916, granted Dec. 23, 1986, a circuit for detecting charged voltage of an electronic flash is disclosed. In the '916 patent, a voltage dividing circuit containing a neon tube and a switching element is connected in parallel with a main capacitor of which a highly charged voltage is applied to a flash lamp for flashing. Only when the switching element is turned on does the voltage dividing circuit produce a divided voltage. The divided voltage is compared with a reference voltage The result of the comparison is used for detecting the charged voltage across the main capacitor.

In U.S. Pat. No. 3,863,128, granted Jan. 28, 1975, a voltage monitoring circuit for monitoring the voltage o a DC to DC converter storage capacitor and for limiting the operation of the DC to DC converter is shown. The voltage monitoring circuit includes a programmable unijunction transistor to compare a voltage to be monitored with a corresponding preset reference voltage. The voltage monitoring circuit of the '128 patent is connected across the storage capacitor.

In U.S. Pat. No. 4,540,265, granted Sept. 10, 1985, an energy-saving electronic flash apparatus includes a status indicator apparatus operable for signaling the readiness of the flash unit for the next flash. Energy-monitoring circuitry causes the status indicator apparatus to signal that the flash unit is sufficiently charged. The energy-monitoring circuitry includes a resistor network and a zener diode connected across the storage capacitor of the flash apparatus.

A disadvantage of the above discussed voltage/energy-monitoring circuitry is that each requires numerous components connected across the storage capacitor, resulting in increased susceptibility to drainage and leakage problems on the storage capacitor. As a result, the voltage on the storage capacitor is undesirably affected. In addition, the components required for directly monitoring voltage across the storage capacitor are high voltage components. Such high voltage components are costly.

In U.S. Pat. No. 4,068,150, granted Jan. 10, 1978, a voltage indication means for an electronic flashing device is shown. The electronic flashing device comprises a DC to DC converter circuit having a main discharging capacitor. The charged voltage of the main discharge capacitor is indicated by utilizing the fact that the charged voltage of the main capacitor is in equivalent relation with a voltage generated in the DC to DC converter. In one embodiment of the '150 patent device, the voltage indication means comprises a resistive network and a luminescent device connected across the primary winding of an oscillating transformer.

A disadvantage of the '150 voltage indication means is that it requires a luminescent device directly in the voltage sensing circuit. As a result, the voltage indication means is susceptible to inefficiencies due to the luminescent device, for example, undesired Current leakage. Furthermore, when sensing primary winding voltage, the voltage indication means of the '150 device does not account for noise induced in the primary winding due to the switching ON and OFF of current flow in the primary winding. As a result, inadvertant firing of the luminescent device may occur, causing false indication of the readiness of the electronic flash device and undesirable operation.

It would thus be desirable to provide an indirect voltage sensing means for sensing voltage on a main storage capacitor of a DC-to-DC converter that is simple, cost effective, and provides a high degree of noise immunity.

OBJECTS OF THE INVENTION

An object of the present invention is to provide an indirect storage capacitor voltage sensing means for a DC-to-DC converter.

Another object of the present invention is to provide high noise immunity.

Still another object of the present invention is to provide a low cost voltage sensing means.

Yet still another object of the present invention is to provide a voltage sensing means which causes no adverse affects on the storage capacitor voltage, that is, there is no undesired drainage of storage capacitor voltage.

Yet still another object of the invention is to provide for multiple output voltages to be easily detected.

SUMMARY OF THE INVENTION

According to the invention, in a flyback type self-oscillating DC-to-DC converter, a voltage sensing means indirectly senses the storage capacitor voltage and indicates when the voltage across a storage capacitor has been charged to a predetermined charged value. The voltage sensing means comprises a voltage dividing resistor having a tap intermediate the ends thereof and being connected across a primary winding of a coupled inductor of the DC-to-DC converter. The voltage across the primary winding corresponds to a voltage on the storage capacitor according to the turns ratio of the primary winding to a secondary winding during a measurement period, the measurement period having first and second portions. A comparing means compares a voltage at the tap of the voltage dividing resistor with a predetermined reference voltage and provides an output signal having first and second conditions when the tap voltage is below or above, respectively, the predetermined reference voltage. The tap on the voltage dividing resistor is set to correspond to the predetermined reference voltage when the storage capacitor has been charged to the predetermined charged value. During the first portion of the measurement period, noise occurs in the primary winding voltage and is detected by the comparing means, the noise being caused by reactive parasitic circuit elements and the switching OFF of current flow in the primary winding by the switching means. A latching means latches the comparing means output signal during the second portion of the measurement period, the second portion being subsequent to the first portion and prior to activation of current flow in the primary winding. When latched in the first or second condition, the latched output signal is indicative of the storage capacitor voltage being below or above, respectively, the predetermined charged value. In an alternate embodiment, delaying means delays activation of the switching means for a sufficient duration to enable the latching means to latch the storage capacitor voltage indication during the second portion of the measurement period and just prior to activation of the switching means. In yet another embodiment, a light emitting means coupled to the output of the latching means emits light when the latching means latches the comparing means output in the second condition.

Indirect storage capacitor voltage sensing is accomplished by sensing the voltage across the primary winding. High noise immunity is achieved as a result of sensing the primary winding voltage during the second portion of the measurement period. The voltage across the primary winding is low, therefore, no costly high voltage sensing means are needed.

DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DESCRIPTION OF THE PREFERRED EMBODIMENT

Figure 1:
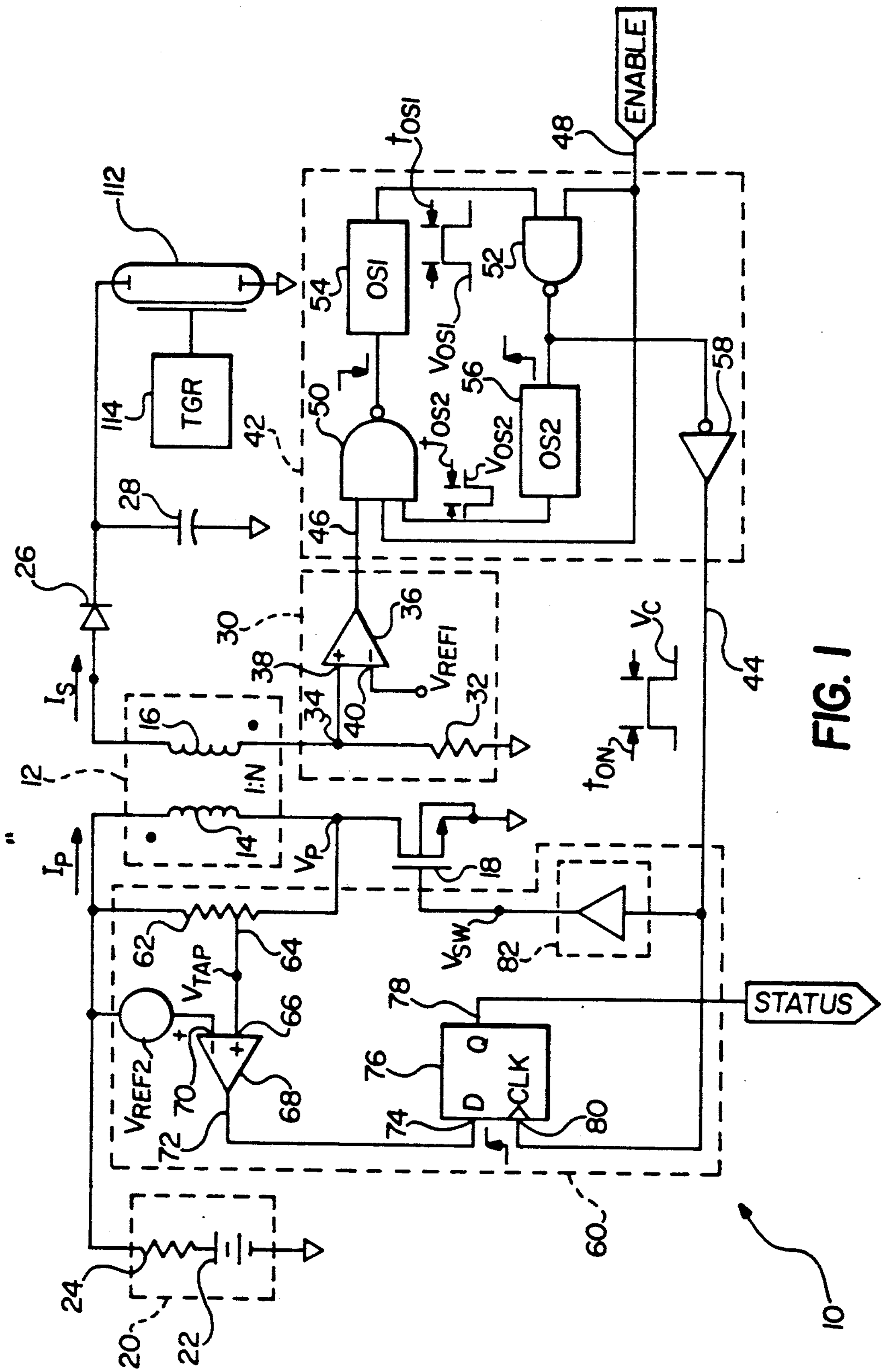
FIG. 1 is a circuit diagram of a DC-to-DC converter incorporating an indirect voltage sensing means according a preferred embodiment of the invention.

Referring now to FIG. 1, a DC-to-DC converter 10 of the type known in the art as a "flyback" converter is shown The DC-to-DC converter comprises a coupled inductor 12 having oppositely wound primary and secondary windings, 14 and 16, respectively. A switching means 18 is connected in series with the primary winding 14 and a low-voltage battery 20. Switching means 18 can comprise for example a MOSFET power switching transistor or an equivalent. Battery 20 is shown as having an open-circuit voltage 22 and an effective internal impedance, identified by numeral 24, wherein the effective internal impedance 24 may vary throughout battery life. A diode 26 is connected in series to the secondary winding 16 and storage capacitor 28, for rectifying charging current to charge capacitor 28. Storage capacitor 28 represents a high-voltage capacitive load.

The flyback converter 10 is constructed and arranged to charge the capacitor 28 to a maximum voltage of approximately 330 volts from the low-voltage battery 20, which may have a maximum open-circuit voltage 22 or approximately 6 volts.

A current sensing means 30 is connected in series with the secondary winding 16 to monitor secondary winding current $I_S$. Current sensing means 30 outputs a logic "0" (LO) or "1" (HI) signal, indicative of secondary winding current $I_S$ being above or below a predetermined minimum threshold current, $I_{MIN}$, respectively. The value of $I_{MIN}$ is selected to provide and achieve optimum performance of the DC-to-DC converter for the requirements of a particular application (e.g., a flyback type self-oscillating flash charger). In particular, the current level $I_{MIN}$ is selected to be different from a zero current level. A non-zero value of $I_{MIN}$ results in improved charge transfer rates, as well as, improved energy transfer efficiency. A discussion of the effects of a non-zero $I_{MIN}$ relating to charge transfer rates and energy transfer efficiency is found in commonly assigned U.S. Pat. No. 4,272,806.

Current sensing means 30 comprises resistor 32 connected in series with secondary winding 16 at node 34. Current sensing means 30 further comprises a comparator 36, wherein a non-inverting input 38 of comparator 36 is connected at node 34. An inverting input 40 of comparator 36 is connected to a reference voltage $V_{REF1}$. The output of comparator 36 is the output of current sensing means 30.

A controlling means 42 comprises an output 44, and two inputs, 46 and 48. Output 44 connects to switching means 18 via delay means 82 to energize switching means 18 ON/OFF. An ON/OFF signal $V_C$ on output 44 causes switching means 18 to enable/disable, respectively, current $I_P$ to flow in primary winding 14. Delay means 82 causes a momentary delay in signal $V_C$, yield in $V_{SW}$, as will be explained subsequently. Input 46 connects to current sensing means 30 to receive the current sensing means 30 output signal which is indicative of the secondary current level. Lastly, input 48 receives a converter charge enable/disable signal.

Controlling means 42 further comprises two logic NAND gates, 50 and 52, respectively, two one-shot multivibrators, 54 and 56, respectively, and an inverting buffer 58. NAND gate 50 comprises a three input NAND gate. A first input of NAND gate 50 is input 46. A second input of NAND gate 50 is connected to converter charge enable/disable input 48. The output of NAND gate 50 is connected to a trigger input of one-shot 54. One-shot 54 is a negative edge-triggered device, whereby, a negative going signal transition (i.e., logic "1" to logic "0") from gate 50 causes one-shot 54 output signal $V_{OSI}$ to change from logic "0" to logic "1." Output signal $V_{OSI}$ remains a logic "1" for time duration $t_{OSI}$. The output of one-shot 54 is connected to a first input of NAND gate 52. NAND gate 52 comprises a two input NAND gate. A second input of NAND gate 52 is connected to converter enable/disable input 48. The output of NAND gate 52 is connected to a trigger input of one-shot 56 and also connected to an input of an inverting buffer 58. The output of one-snot 56 is connected to a first input of NAND gate 50. The output of inverting buffer 58 is connected to switch means 18 via output 44.

In a presently preferred embodiment as shown in FIG. 1, a voltage sensing means 60 comprises a voltage dividing resistor 62 having a tap 64 intermediate the ends thereof. Voltage dividing resistor 62 is connected across primary winding 14. Tap 64 is connected to non-inverting input 66 of comparator 68 An inverting input 70 of comparator 68 is connected to a reference voltage $V_{REF2}$. Reference voltage $V_{REF2}$ is connected with respect to battery 20 so that any changes in battery 20 output voltage will be transparent to voltage sensing means 60. An output 72 of comparator 68 is connected to an input 74 of latching means 76. A signal on input 74 is latched to output 78 upon the occurrence of a positive going signal transition at a clock input 80. Output 44 of control means 42 is connected to clock input 80. Latching means 76 can comprise, for example, a D-type flip-flop. Output 78 represents the status output of voltage sensing means 60. A logic 1 (HI) state on output 78 indicates that voltage on storage capacitor 28 has reached a predetermined charged value, whereas, a logic 0 (LO) indicates that the voltage on storage capacitor 28 has not yet reached the predetermined value.

Voltage sensing means 60 further comprises means 82 for delaying the activation of switching means 18 by control means 42. Delaying means 82 is connected between output 44 of control means 42 and switching means 18. Delaying means 82 comprises, for example, a non-inverting buffer. Delaying means 82 provides a delay of sufficient duration, $t_{DELAY}$, to allow latching means 76 to latch the comparing means 68 output signal prior to activation of switching means 18 by control means 42.

Figures 2A, 2B, 2C, 2D, 2E, 2F, 2G:
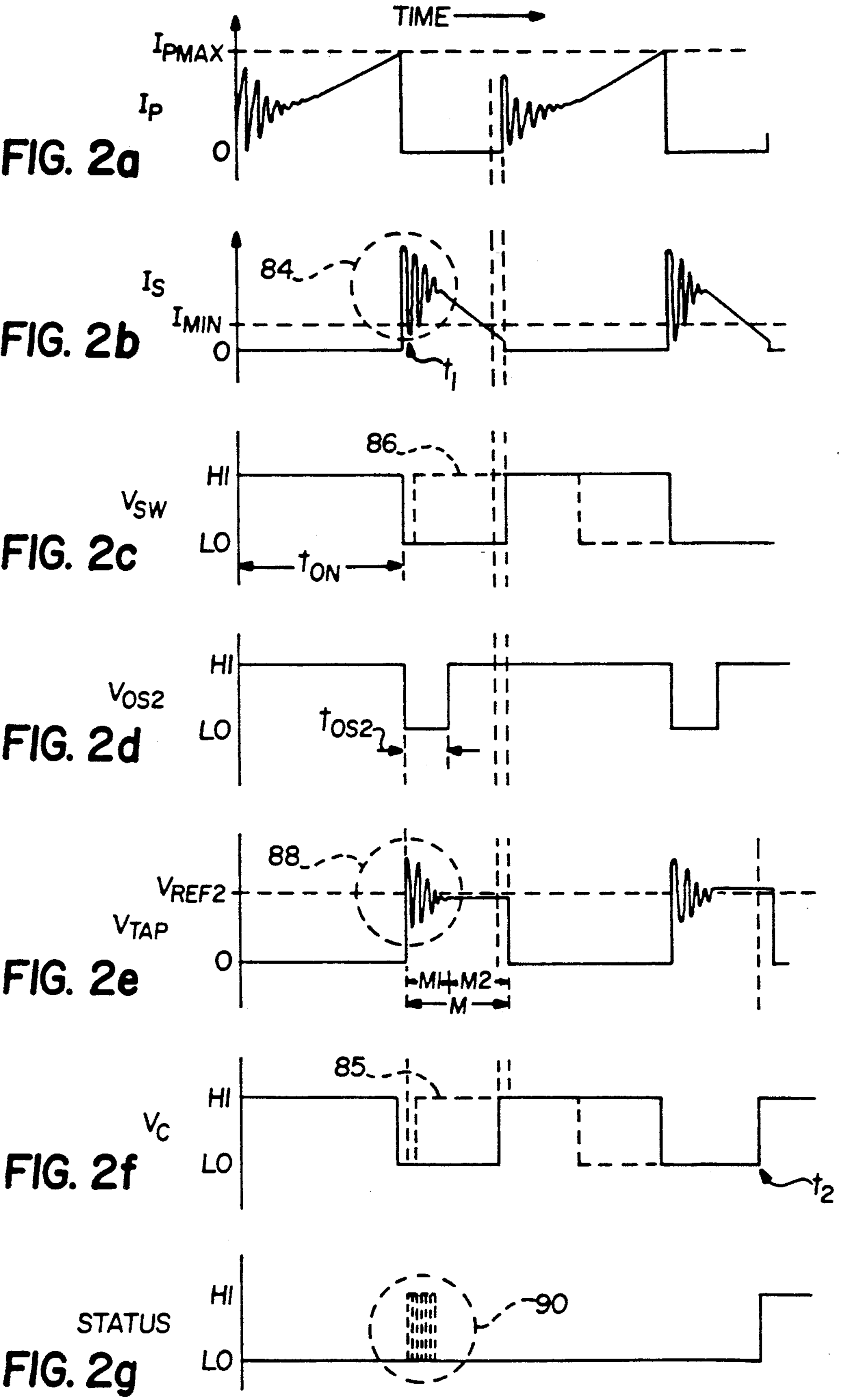
FIG. 2*a*–2*c* illustrates signal waveforms which exist at various points in the circuit diagram of FIG. 1.

Briefly described, the flyback converter 10 operates as follows, making reference to FIGS. 1 and 2. Assume that a charge enable signal on input 48 is received by the controlling means 42. Upon receipt of the enable signal, the controlling means 42 turns switching means 18 ON ($V_{SW}$ is HI) for a predetermined time $t_{ON}$ (FIG. 2c). With switching means 18 ON, current $I_P$ flows from the battery 20 through the primary winding 14 of the coupled inductors 12 (FIG. 2a) and energy is stored in the inductor primary 14. Current $I_P$ increases (FIG. 2a) in the inductor primary 14 approximately in accordance with the equation:

$$I_p=(V_{oc}/R_{tot})\,(1-e^{-t/\tau})+nI_{sMIN}e^{-t/\tau}$$

Where $I_p$ is primary current;

$V_{oc}$ is open circuit power source voltage;

$R_{tot}$ is total series resistance of primary circuit including source internal resistance, switch transistor ON resistance, wiring resistance, and coil resistance;

t is the time measured from transistor turn ON;

$\tau$ is the effective R-L time constant, $L_p/R_{tot}$, where $L_p$ is the value of the primary inductance;

n is the turns ratio of the coupled inductors;

$I_s$ is secondary current; and $I_{sMIN}$ is the minimum secondary current threshold level.

After expiration of time $t_{ON}$, the controlling means 42 turns the switching means 18 OFF is ($V_{SW}$ is LO) via output 44, whereby, current $I_P$ in the primary winding 14 is interrupted (FIG. 2a). Stored energy in the inductor primary 14 is then transferred to the secondary winding 16 and current $I_S$ (FIG. 2b) begins to flow. Current $I_S$ flows through secondary winding 16, diode 26, and storage capacitor 28, thus charging capacitor 28. When current $I_S$ in the secondary winding 16, sensed by the current sensing means 30, decreases below predetermined minimum threshold current level, $I_{MIN}$, current sensing means 30 output changes from a logic "0" to a logic "1". This output signal is received by input 46 of controlling means 42. The controlling means 42 then turns the switching means 18 ON again for time $t_{ON}$ and the charging cycle repeats.

Referring now to FIG. 2a, $I_{Pmax}$ is the peak primary winding current obtained during a single charging cycle. During operation of the converter 10, as the internal impedance 24 of the battery 20 increases, the peak primary current $I_{Pmax}$ will decrease accordingly in reference to the above given equation for $I_P$. By maintaining a fixed predetermined ON time $t_{ON}$ and having a non-zero secondary current threshold $I_{MIN}$, the converter "load" tracks or similarly matches the power source internal impedance over the life of the power source. A discussion of energy transfer efficiency and battery fire performance is found in commonly assigned U.S. Pat. No. 4,272,806.

Upon termination of current $I_P$ in the inductor primary 14, current $I_S$ begins to flow in the inductor secondary 16. As shown in FIG. 2b, noise, indicated by numeral 84, is present in current $I_S$ due to reactive parasitic circuit elements, for example, a parasitic leakage inductance (not shown) of coupled inductor 12. Noise 84 makes controlling means 42 susceptible to prematurely activating switching means 18 via signal $V_{SW}$ as indicated by numeral 86 in FIG. 2c, corresponding to signal $V_C$ as indicated by numeral 85 in FIG. 2f. The premature activation would result from current sensing means 30 detecting current $I_S$ decreasing below the level of $I_{Smin}$ at a time $t_l$ (FIG. 2b). The premature activation of switching means 18 would cause undesired deteriorated performance of converter 10. Drive controlling means 42 therefore includes a means for preventing such a premature activation of switching means 18, the preventing means comprising one-shot 56 connected to NAND gate 50.

Controlling means 42 operates as follows. NAND gate 50 receives three inputs, a first input from current sensing means 30. Assuming for the moment that the second and third inputs of NAND gate 50 are at logic "1" (HI), then the output of gate 50 is dependant upon the output of current sensing means 30. When the output of current sensing means 30 is logic "0" (LO), then the output of NAND gate 50 is logic "1" (HI). The output of current sensing means 30 is LO when secondary current $I_S$ is above $I_{MIN}$. Upon secondary current $I_S$ decreasing below $I_{MIN}$, the output of current sensing means 30 changes from logic "0" (LO) to logic "1" (HI) and the output of NAND gate 50 likewise changes from logic "1" (HI) to logic "0" (LO).

One-shot 54 receives, as input, the output of NAND gate 50. As previously mentioned, one-shot 54 is a negative edge-triggered device, whereby, a negative going signal transition (i.e.. logic "1" to logic "0") from gate 50 causes one-shot 54 output signal $V_{OS1}$ to change from logic "0" to logic "1" for time duration $t_{OS1}$. Output signal $V_{OS1}$ is received as a first input of NAND gate 52. NAND gate 52 receives a second input from converter enable/disable input 48, which we have said for the moment is in a logic "1" state. When $V_{OS1}$ is in a logic "1" state and input 48 is in a logic "1" state, the output of NAND gate 52 is in a logic "0" or LO state. A LO state in the output of gate 52 is converted into a HI state on the output of inverting buffer 58. The output of inverting buffer 58 is the output 44 of controlling means 42. As we have mentioned previously, output 44 provides signal $V_{SW}$ to switching means 18 via delay means 82. Signal $V_{SW}$ remains in the HI state for the time duration $t_{ON}$. During time duration $t_{ON}$, current $I_P$ flows in inductor primary 14 and no current flows in inductor secondary 16. The time duration of $t_{OS1}$ of the logic "1" Pulse of output signal $V_{OS1}$ is set to provide the desired predetermined ON time, corresponding to the time duration $t_{ON}$ of signal $V_C$ and $V_{SW}$.

Upon expiration of time $t_{OS1}$, output $V_{OS1}$ of one-shot 54 changes state from HI to LO, causing the output of NAND gate 52 to change from LO to HI, and causing the output of inverting buffer 58 (i.e., $V_C$) to change from HI to LO. Switching means 18 is therefore deactivated (i.e., turned OFF) upon signal $V_{SW}$ changing rom HI to LO. One-shot 56 is a positive edge-triggered one-shot device and has its input connected to the output of NAND gate 52. Upon the positive-edge transition from LO to HI of the output of gate 52, the output $V_{OS2}$ of one-shot 56 changes state from HI to LO, remaining LO for time duration $t_{OS2}$. $V_{OS2}$ is the third input to NAND gate 50. The LO state in signal $V_{OS2}$ causes the output of NAND gate 50 to change from a LO state to a HI state and to remain HI for the time duration $t_{OS2}$. NAND gate 50 is therefor prevented from changing its output state during time duration $t_{OS2}$, that is, a HI to LO transition is prevented. As a result, noise 84 in current $I_S$ is prevented from prematurely triggering one-shot 54 at time $t_1$ in FIG. 2*b*, and thus switching means 18. An undesired triggering or one-shot 54 would result in an undesired LO to HI signal transition in signal $V_C$ for duration of time $t_{ON}$ as indicated by numeral 85 in FIG. 2*f*. Correspondingly, signal $V_{SW}$ would be HI for duration $t_{ON}$ (as indicated by numeral 86 in FIG. 2*c*) resulting in the undesired activation of switching means 18. Because of the LO presented by signal $V_{OS2}$ on the third input of NAND gate 50, the output of current sensing means 30 has no effect on the output of gate 50.

Time duration $t_{OS2}$ is selected to be longer than the time duration of noise 84. For example, noise 60 has been found to be approximately $200\times10^{-9}$ seconds in duration. Time, $t_{OS2}$, is thus selected to be longer than the time duration of noise 60, say for example, $450\times10^{-9}$ seconds.

The second input to NAND gate 50 is connected to controlling means input 48. Input 48 represents a converter enable/disable signal line. That is, when a logic "1" (HI) appears on input 48, drive controlling means 42 is enabled, NAND gate 50 receives a logic "1" at its second input, and the converter operates as previously discussed. When a logic "0". (LO) appears on input 48, drive controlling means 42 is disabled, NAND gate 50 receives a logic "0" (LO) at its second input, and converter 10 is disabled A logic "0" on the second input of gate 50 inhibits gate 50 from changing its output, regardless of a HI or LO state on the first and third inputs. As a result, converter 10 is effectively disabled. Enabling or disabling converter 10 is desirable to control the amount of voltage stored on capacitor 28. For example, an inverted status output (not shown) of latching means 76 of voltage sensing means 60 could be connected to input 48 to provide a HI or LO signal corresponding to the voltage on capacitor 28 being below or above a predetermined value, respectively, for controlling the converter 10.

Referring now to FIGS. 1 and 2, according to a preferred embodiment, the voltage sensing means 60 operates as follows in conjunction with self-oscillating flyback converter 10. The voltage across primary winding 14 is proportional to the storage capacitor output voltage according to the turns ratio (1:N) of the coupled inductor 12 during a measurement period M (FIG. 2*e*). The measurement period M is a period of time corresponding to when current Is flowing in secondary winding 16 (FIG. 2*b*) The measurement period M can be characterized as having a first portion Ml and a second portion M2. Voltage $V_{TAP}$ is proportional to the voltage across primary winding 14. Tap 64 is set such that voltage $V_{TAP}$ corresponds to the predetermined reference voltage $V_{REF2}$ when the storage capacitor output voltage is at the desired predetermined charged voltage value. The desired predetermined charged voltage value on storage capacitor 28 can comprise, for example, a full charge value $V_{FULL}$. Comparing means 68 compares voltage $V_{TAP}$ with predetermined reference voltage $V_{REF2}$. The output of comparing means 68 reflects whether voltage $V_{TAP}$ is below or above reference voltage $V_{REF2}$, corresponding to a logic 0 (LO) or a logic 1 (HI), respectively. Accordingly, tap 64 of voltage dividing resistor 62 is adjusted so that voltage $V_{TAP}$ equals voltage $V_{REF2}$ when the voltage on storage capacitor 28 has charged to the desired predetermined charged value (e.g., $V_{FULL}$).

As can be seen in FIG. 2*e*, noise indicated by numeral 88 occurs in voltage $V_{TAP}$ during the measurement period M. Noise 88, similar to noise 84, occurs due to the non-idealities of circuit components in converter 10, for instance, the parasitic leakage inductance (not shown) of coupled inductor 12. As a result of noise 88, the output of comparing means 68 is susceptible to fluctuations between LO and HI. Noise 88 has been found to be approximately $200\times10^{-9}$ seconds in duration and occurs during the first portion Ml of measurement period M. If the output 78 of latching means 76 were to reflect the comparing means 68 output signal condition during the first portion Ml of period M, then noise 88 would cause fluctuations as indicated by numeral 90 in FIG. 2*g* However, such an occurrence is undesirable.

Voltage $V_{TAP}$ is free of noise during the second portion M2 of period M (FIG. 2*e*). Therefore, to ensure an accurate determination of output voltage on storage capacitor 28, latching means 76 latches the output of comparing means 68 during the second portion M2 of period M. The second portion M2 is subsequent to the first portion M1 and prior to activation of current low $I_P$ in primary winding 14.

Latching of latching means 76 during the second portion M2 of measurement period M is accomplished by the receipt of a positive-edge signal transition at clock input 80 during portion M2. One way of providing such a positive-edge signal transition is to use output signal $V_C$ of control means 42 which contains such a positive-edge signal transition. Because the output 44 of control means 42 is also used to control switching means 18, delay means 82 delays activation of the switching means 18 by the control means 42. Delay means 18 provides a sufficient delay to enable latching means 6 to latch the comparing means 68 output signal condition during portion M2 of the measurement Period M and just prior to activation of the switching means 18 by control means 42. Latching of latching means 76 just prior to activation of switching means 18 by control means 42 provides voltage indication near the end of a single charging cycle and assures noise free measurement.

Upon the voltage across storage capacitor 28 reaching the predetermined charged value, voltage $V_{TAP}$ will be greater than $V_{REF2}$ during the second portion M2 of measurement period M (FIG. 2*e*). As a result, the output of comparing means 68 will be in the second condition (i.e., HI). Upon the occurrence in signal $V_C$ of the positive-edge signal transition (indicated by time $t_2$ in FIG. 2*f*), latching means 76 latches the output signal of comparing means 68 in the second condition (i.e., HI).

As previously mentioned, the inverted status output (not shown) of latching means 76 of voltage sensing means 60 could be connected to input 48 to provide a HI or LO signal corresponding to the voltage on capacitor 28 being below or above a predetermined value, respectively, for controlling the converter 10. In this regard, when latching means 76 latches the out ut signal of comparing means 68 in the second condition, the converter would be disabled. Likewise, when latching means 76 latches the output signal of comparing means in the first condition, the converter would be enabled.

Figure 3:
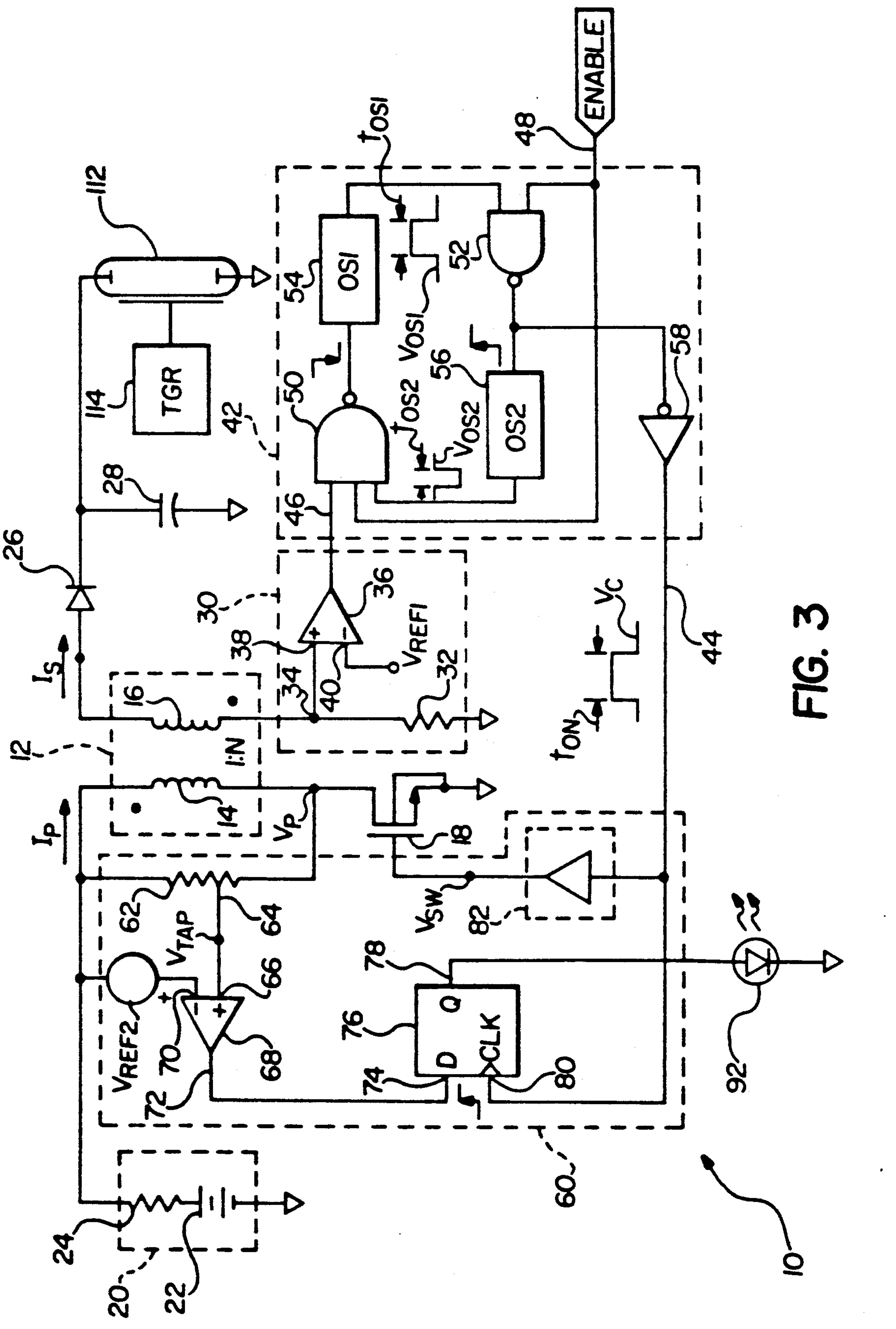
FIG. 3 is a circuit diagram of a DC-to-DC converter incorporating an indirect voltage sensing means according a first alternate embodiment of the invention.

In an alternate embodiment as shown in FIG. 3, a light emitting means 92, for example a light emitting diode, is connected to output 78 of latching means 76. The alternate embodiment of FIG. 3 operates similarly to the preferred embodiment of FIG. 1, with the addition of visual indication that storage capacitor 28 has been charged to the desired full charge voltage (i.e $V_{FULL}$). The visual indication is provided by light emitting means 92. Light emitting means 92 emits light when latching means 76 latches the output of comparing means 68 in the second condition.

Figure 4:
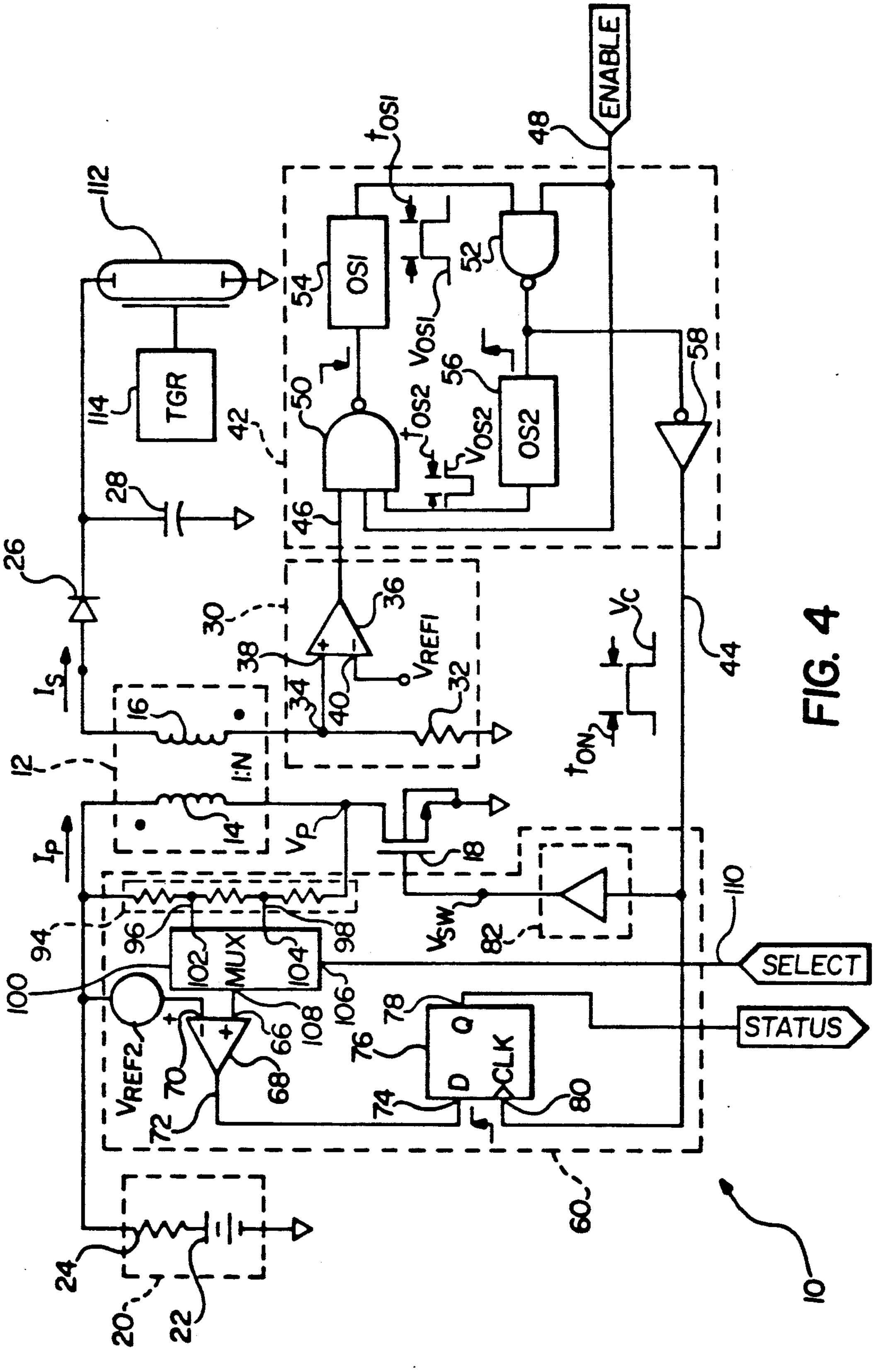
FIG. 4 is a circuit diagram of a DC-to-DC converter incorporating an indirect voltage sensing means according a second alternate embodiment of the invention.

In yet another alternate embodiment shown in FIG. 4, voltage sensing means 60 is similar to that shown in FIG. 1 with the following differences. Voltage sensing means 60 comprises a voltage divider resistor network 94 having first and second taps, 96 and 98, respectively, intermediate the ends thereof. Voltage divider resistor network 94 is connected across the primary winding 14 of coupled inductor 12. Taps 96 and 98 are set such that voltages $V_{TAP1}$ and $V_{TAP2}$, corresponding to voltages at first and second taps 96 and 98, respectively, correspond to the predetermined reference voltage $V_{REF2}$ when the storage capacitor output voltage is at first and second desired predetermined charged voltage values, respectively. First and second desired predetermined charged voltage values on storage capacitor 28 can comprise, for example, a full charge value $V_{FULL}$ and a flash ready value $V_{READY}$, respectively.

In the alternate embodiment of FIG. 4, voltage sensing means 60 further comprises a selecting means 100 having first and second inputs 102 and 104, respectively a select input 106, and an analog output 108. Selecting means 100 comprises for example an analog multiplexer (MUX). First and second taps, 96 and 98, are connected to first and second analog inputs 102 and 104, respectively. Voltage sensing means 60 further comprises charge level select input 110. Charge level select input 110 is connected to select input 106 of select means 100; whereby, a logic "0" (LO) on select input 106 causes the voltage $V_{TAP1}$ at first tap 96 to appear on the output of select means 100. Similarly, a logic "1" (HI) on select input 106 causes the voltage $V_{TAP2}$ at second tap 98 to appear on the output of select means 100. The output 108 of selecting means 100 is connected to the non-inverting input 66 or comparing means 68. Although only two charge level values have been shown, it is to be understood that a plurality of charge level selections may be implemented in a similar manner as described.

The alternate embodiment of FIG. 4 operates similarly to the preferred embodiment of FIG. 1 with the following differences. Select input 110 of voltage sensing means 60 is used to select the predetermined charged value for storage capacitor 28. A logic "0" (LO) on input 106 selects $V_{TAP1}$ whereas a logic "1" (HI) on input 106 selects $V_{TAP2}$. The predetermined storage capacitor voltage charged values can correspond to a full charge level ($V_{FULL}$) and a flash ready level ($V_{READY}$), respectively. In this manner, the voltage sensing means 60 is easily adaptable for sensing a plurality of storage capacitor voltage values.

Figure 5:
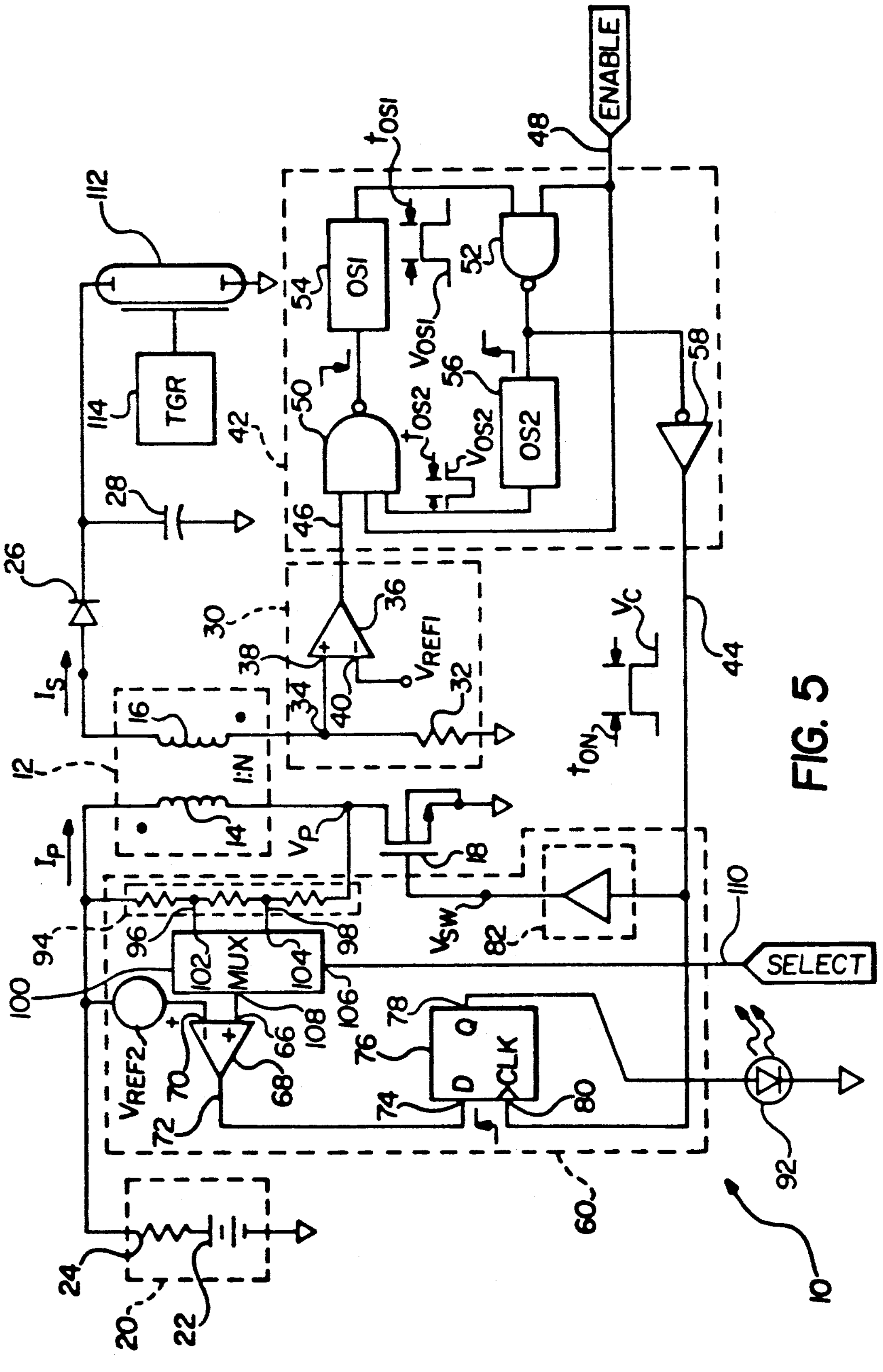
FIG. 5 is a circuit diagram of a DC-to-DC converter incorporating an indirect voltage sensing means according a third alternate embodiment of the invention.

In an alternate embodiment as shown in FIG. 5, light emitting means 92 is connected to output 78 of latching means 76. The alternate embodiment of FIG. 5 operates similarly to the embodiment of FIG. 4, with the addition of visual indication that storage capacitor 28 has been charged to the selected predetermined charged value (i.e., $V_{FULL}$ or $V_{READY}$). The visual indication is provided by light emitting means 92. Light emitting means 92 emits light when latching means 76 latches the output of comparing means 68 in the second condition.

In yet another alternate embodiment, voltage sensing means 60 is incorporated into an electronic flashing device. For example, an electronic flashing device comprises converter 10, voltage sensing means 60 a flashing discharge tube 112, and flash triggering means 114. See FIGS. 1, 3, 4, and 5. The flashing discharge tube 112 is connected across storage capacitor 28, capacitor 28 representing a high voltage discharging capacitor. In operation, a charge enable signal received at enable input 48 causes converter 10 to charge capacitor 28. Upon voltage sensing means 60 sensing the desired predetermined charged value (e.g., $V_{FULL}$), latching means 76 latches the comparing means 68 output signal in the second condition. The electronic flashing device is thereupon ready for firing the flash discharge tube 112. Upon closure of a flash activation switch (not shown), the flash triggering means 114 causes the discharge tube 112 to be fired by means of energy stored in the discharging capacitor 28

There is thus provided a voltage sensing means for a DC-to-DC converter and an electronic flashing device which provides substantial advantages over the prior art. Specifically, the voltage sensing means provides simple, cost effective, and high noise immunity storage capacitor voltage sensing.

While the invention has been particularly shown and described with respect to the certain preferred embodiments thereof, it will be understood by those skilled in the art that the foregoing and other changes in form and detail may be made therein without departing from the spirit and scope of the invention.

What is claimed is:

1. In a flyback type self-oscillating DC-to-DC converter having a high voltage storage capacitor, a coupled inductor having primary and secondary windings, a switching means coupled to the primary winding, and a control means, wherein the control means alternately activates and deactivates the switching means so that current induced in the secondary winding in response to current action in the primary winding charges the storage capacitor; a voltage sensing means for indirectly sensing the storage capacitor voltage and indicating when the voltage across the storage capacitor has been charged to a predetermined charged voltage, comprising:

a voltage dividing resistor connected across the primary winding, the resistor having a tap intermediate the ends thereof, the voltage across the primary winding corresponding to a voltage on the storage capacitor according to the turns ratio of the primary winding to the secondary winding measured during a measurement period, the measurement period having first and second portions and being a period of time when the control means deactivates the switching means whereby current flows in the secondary winding;

a predetermined reference voltage;

means for comparing a voltage at the tap of said voltage dividing resistor with the predetermined reference voltage, the tap on said voltage dividing resistor being set to correspond to the predetermined reference voltage when the voltage on the storage capacitor is at the predetermined charged voltage, said comparing means providing an output signal having (a) a first condition when the tap voltage is below said predetermined reference voltage corresponding to the storage capacitor voltage being below the desired charged voltage and (b) having a second condition when the tap voltage is above said predetermined reference voltage corresponding to the storage capacitor voltage being above the desired charges voltage, said output signal being susceptible to fluctuations between said first and second conditions during the first portion of the measurement period; and means for latching said comparing means output signal during the second portion of the measurement period, the second portion being subsequent to the first portion, said latching means being coupled to said comparing means and the control means.

2. Voltage sensing means as recited in claim 1 further wherein said latching means latches said comparing means output signal during the second portion of the measurement period just prior to activation of the switching means by the control means.

3. Voltage sensing means as recited in claim 2 further comprising means for delaying activation of the switching means a sufficient duration to enable said latching means to latch said comparing means output signal just prior to activation of the switching means, said delaying means being coupled between the control means and the switching means.

4. Voltage sensing means as recited in claim 3 further comprising means coupled to said latching means for emitting light when said latching means latches the output signal of said comparing means in the second condition.

5. In a flyback type self-oscillating DC-to-DC converter having a high voltage storage capacitor, a coupled inductor having primary and secondary windings, a switching means coupled to the primary winding, and a control means, wherein the control means alternately activates and deactivates the switching means so that current induced in the secondary winding in response to current action in the primary winding charges the storage capacitor; a voltage sensing means for indirectly sensing the storage capacitor voltage and indicating when the voltage across the storage capacitor has been charged to a predetermined charged voltage, comprising:

a voltage dividing resistor network connected across the primary winding, the resistor network having a plurality of taps intermediate the ends thereof, the voltage across the primary winding corresponding to a voltage on the storage capacitor according to the turns ratio of the primary winding to the secondary winding measured during a measurement period, the measurement period having first and second portions and being a period of time when the control means deactivates the switching means whereby current flows in the secondary winding;

a predetermined reference voltage;

means for selecting a tap from the plurality of taps of said voltage dividing resistor network, a selected tap corresponding to a selected predetermined storage capacitor voltage, said selecting means being coupled to the plurality of taps;

means for comparing a voltage at the selected tap with the predetermined reference voltage, the plurality on taps on said voltage dividing resistor network being set to correspond to the predetermined reference voltage when the voltage on the storage capacitor is at the selected predetermined charged voltage, said comparing means providing an output signal having (a) a first condition when the tap voltage is above said predetermined reference voltage corresponding to the storage capacitor voltage being below the selected desired charged voltage and (b) having a second condition when the tap voltage is above said Predetermined reference voltage corresponding to the storage capacitor voltage being above the selected desired charged voltage, said output signal being susceptible to fluctuations between said first and second conditions during the first portion of the measurement period; and means for latching said comparing means output signal during a second portion of the measurement period, the second portion being subsequent to the first portion, said latching means being coupled to said comparing means and the control means.

6. Voltage sensing means as recited in claim 5 further wherein said latching means latches said comparing means output signal during the second portion of the measurement period just prior to activation of the switching means by the control means 7. Voltage sensing means as recited in claim 6 further comprising means for delaying activation of the switching means a sufficient duration to enable said latching means to latch said comparing means output signal just prior to activation of the switching means, said delaying means being coupled between the control means and the switching means.

8. Voltage sensing means as recited in claim 7 further comprising means coupled to said latching means for emitting light when said latching means latches the output signal of said comparing means in the second condition.

9. In an electronic flashing device having a flashing discharge tube;

a high voltage discharging capacitor for firing the discharge tube by means of energy stored in said discharging capacitor; and a flyback type self-oscillating DC-to-DC converter including a coupled inductor having primary and secondary windings, a switching means coupled to the primary winding, and a control means, wherein the control means alternately activates and deactivates the switching means so that current induced in the secondary winding in response to current action in the primary winding charges the discharging capacitor; a voltage sensing means for indirectly sensing the discharging capacitor voltage and indicating when the voltage across the discharging capacitor has been charged to a predetermined charged voltage, comprising:

a voltage dividing resistor connected across the primary winding, the resistor having a tap intermediate the ends thereof, the voltage across the primary winding corresponding to a voltage on the discharging capacitor according to the turns ratio of the primary winding to the secondary winding measures during a measurement period, the measurement period having first and second portions and being a period of time when the control means deactivates the switching means whereby current flows in the secondary winding;

a predetermined reference voltage;

means for comparing a voltage at the tap of said voltage dividing resistor with the predetermined reference voltage, the tap on said voltage dividing resistor being set to correspond to the predetermined reference voltage when the voltage on the discharging capacitor is at the predetermined charged voltage, said comparing means providing an output signal having (a) a first condition when the tap voltage is below said predetermined reference voltage corresponding to the discharging capacitor voltage being below the desired charged voltage and (b) having a second condition when the tap voltage is above said predetermined reference voltage corresponding to the discharging capacitor voltage being above the desired charged voltage, said output signal being susceptible to fluctuations between said first and second conditions during the first portion of the measurement period; and means for latching said comparing means output signal during the second portion of the measurement period, the second portion being subsequent to the first portion, said latching means being coupled to said comparing means and the control means.

10. Voltage sensing means as recited in claim 9 further wherein said latching means latches said comparing means output signal during the second portion of the measurement period just prior to activation of the switching means by the control means.

11. Voltage sensing means as recited in claim 10 further comprising means for delaying activation of the switching means a sufficient duration to enable said latching means to latch said comparing means output signal just prior to activation of the switching means, said delaying means being coupled between the control means and the switching means.

12. Voltage sensing means as recited in claim 11 further comprising means for coupled to said latching means emitting light when said latching means latches the output signal of said comparing means in the second condition.

13. In an electronic flashing device having a flashing discharge tube;

a high voltage discharging capacitor for firing the discharge tube by means of energy stored in said discharging capacitor; and type self-oscillating DC-to-DC converter including a coupled inductor having primary and secondary windings, a switching means coupled to the primary winding, and a control means, wherein the control means alternately activates and deactivates the switching means so that current induced in the secondary winding in response to current action in the primary winding charges the discharging capacitor; a voltage sensing means for indirectly sensing the discharging capacitor voltage and indicating when the voltage across the discharging capacitor has been charged to a predetermined charged voltage, comprising:

a voltage dividing resistor network connected across the primary winding, the resistor network having a plurality of taps intermediate the ends thereof, the voltage across the primary winding corresponding to a voltage on the discharging capacitor according to the turns ratio of the primary winding to the secondary winding measured during a measurement period, the measurement period having first and second portions and being a period of time when the control means deactivates the switching means whereby current flows in the secondary winding;

a predetermined reference voltage;

means for selecting a tap from the plurality of taps of said voltage dividing resistor network, a selected tap corresponding to a selected predetermined discharging capacitor voltage, said selecting means being coupled to the plurality of taps;

means for comparing a voltage at the selected tap with the predetermined reference voltage, the plurality of taps on said voltage dividing resistor network being set to correspond to the predetermined reference voltage when the voltage on the discharging capacitor is at the selected predetermined charged voltage, said comparing means providing an output signal having (a) a first condition when the tap voltage is below said predetermined reference voltage corresponding to the discharging capacitor voltage being below the selected desired charged voltage and (b) having a second condition when the tap voltage is above said predetermined reference voltage corresponding to the discharging capacitor voltage being above the selected desired charged voltage, said output signal being susceptible to fluctuations between said first and second conditions during the first portion of the measurement period; and means for latching said comparing means output signal during a second portion of the measurement period, the second portion being subsequent to the first portion, said latching means being coupled to said comparing means and the control means.

14. Voltage sensing means as recited in claim 13 further wherein said latching means latches said comparing means output signal during the second portion of the measurement period just prior to activation of the switching means by the control means.

15. Voltage sensing means as recited in claim 14 further comprising means for delaying activation of the switching means a sufficient duration to enable said latching means to latch said comparing means output signal just prior to activation of the switching means, said delaying means being coupled between the control means and the switching means.

16. Voltage sensing means as recited in claim 15 further comprising means coupled to said latching means for emitting light when said latching means latches the output signal of said comparing means in the second condition.

* * * * *